United States Patent [19]
Dombrowski et al.

[11] Patent Number: 5,311,746
[45] Date of Patent: May 17, 1994

[54] METHOD AND APPARATUS FOR SENSING TEMPERATURE OF VEHICLE INTERIOR

[75] Inventors: Henry P. Dombrowski, Highland; Michael A. Dahl, Royal Oak; Robert P. Hennessee, Rochester Hills, all of Mich.

[73] Assignee: Chrysler Corporation, Highland Park, Mich.

[21] Appl. No.: 71,136

[22] Filed: Jun. 1, 1993

[51] Int. Cl.⁵ .............................................. F25B 49/02
[52] U.S. Cl. .......................................... 62/131; 62/158; 62/244; 236/DIG. 19
[58] Field of Search .............. 62/131, 158, 244, 239, 62/243; 236/51, DIG. 19, 49.3; 165/16, 41, 42, 43

[56] References Cited

U.S. PATENT DOCUMENTS

| | | | |
|---|---|---|---|
| 4,274,265 | 6/1981 | Okumura | 62/158 |
| 5,003,785 | 4/1991 | Petri et al. | 62/131 |
| 5,065,587 | 11/1991 | Howland et al. | 62/131 |
| 5,167,273 | 12/1992 | Terry et al. | 236/DIG. 19 |

FOREIGN PATENT DOCUMENTS

| | | | |
|---|---|---|---|
| 56-82627 | 7/1981 | Japan | 62/131 |
| 58-96934 | 6/1983 | Japan | 236/DIG. 19 |

*Primary Examiner*—Harry B. Tanner
*Attorney, Agent, or Firm*—Wendell K. Fredericks

[57] ABSTRACT

A temperature sensing device for a vehicle samples air from an interior passenger compartment to determine passenger compartment temperature by purging air in a region surrounding a temperature sensor, in favor of passenger compartment air. A sensor triggered by door operation allows the purging process to begin before a passenger enters the vehicle and the vehicle's automatic temperature control system is activated. A method of accurately measuring the temperature of air in the passenger compartment of the vehicle involves the steps of sensing that the passenger is about to enter the vehicle purging the air in the region surrounding the sensor and drawing in air from the passenger compartment, and measuring the air at the sensor after the purging step.

15 Claims, 2 Drawing Sheets

METHOD AND APPARATUS FOR SENSING TEMPERATURE OF VEHICLE INTERIOR

BACKGROUND OF THE INVENTION

The present invention relates in general to a vehicle temperature sensing device that samples air from an interior passenger compartment to determine passenger compartment temperature. More particularly, the present invention relates to a device that purges air in a region surrounding a temperature sensor, in favor of passenger compartment air, the purging taking place before the vehicle's automatic temperature control system is activated.

Automatic temperature control ("ATC") systems are known to measure interior compartment temperature. The measured temperature is used by the ATC system to activate subsystems that will lower or raise compartment temperature to meet passenger expectations. Relevant subsystems of the ATC system include ventilation mode, recirculation door positions, blower speeds and refrigeration cycles.

Typically, a sensor or thermistor that measures interior passenger compartment temperature is located in a dashboard of the vehicle, a region of the vehicle that generally maintains a temperature different from that of the passenger compartment. Before passenger compartment temperature may be accurately measured, air in the immediate area of the sensor must be purged in favor of air pulled in from the passenger compartment.

With regard to conventional ATC systems, purging does not typically begin until after the ATC is activated, which occurs after the ignition system of the vehicle is activated. Until the air having a temperature that is dissimilar to that of the vehicle passenger compartment is purged from the area surrounding the sensor or thermistor located in the dashboard, precise implementation of ATC subsystems is impossible. The ATC system can only make gross assumptions regarding compartment air temperature.

Ventilation related systems are known that are activated when a key is inserted into a vehicle door, or the door is unlocked. Such systems, however, do not suggest or teach the importance of obtaining an accurate temperature measurement of interior compartment air by purging air of dissimilar temperature from the region of the temperature sensor before the system begins to make measurements.

SUMMARY OF THE INVENTION

A disclosed temperature sensing device purges air from the region surrounding a temperature sensor or thermistor in favor of air pulled in from an interior passenger compartment of a vehicle before the ignition system of the vehicle is even activated. In a preferred embodiment, the purging of air around the thermistor begins as soon as a door of the vehicle is ajar, using a sensor triggered by slight door movement. Alternatively, purging may begin upon unlocking a vehicle door, when a door is unlatched, and/or when a vehicle lighting system is activated, such as when a car door is opened and a dome light turns on.

By starting the purging process before passengers are inside the vehicle and before the vehicle's automatic temperature control ("ATC") system is actually started, more accurate temperature readings may be made. As a result, subsystems of the ATC system, including ventilation mode, recirculation door positions, blower speeds and refrigeration cycles, may be more efficiently utilized to set passenger compartment temperature at a desired level. Otherwise, the ATC system makes gross assumptions that result in errors and undesirable passenger conditions.

BRIEF DESCRIPTION OF THE DRAWINGS

The various features and inventive aspects of the present invention will become more apparent upon reading the following detailed description and claims together with the drawings, wherein reference numerals identify corresponding components, and:

DETAILED DESCRIPTION OF A PREFERRED EMBODIMENT

Figure 1:
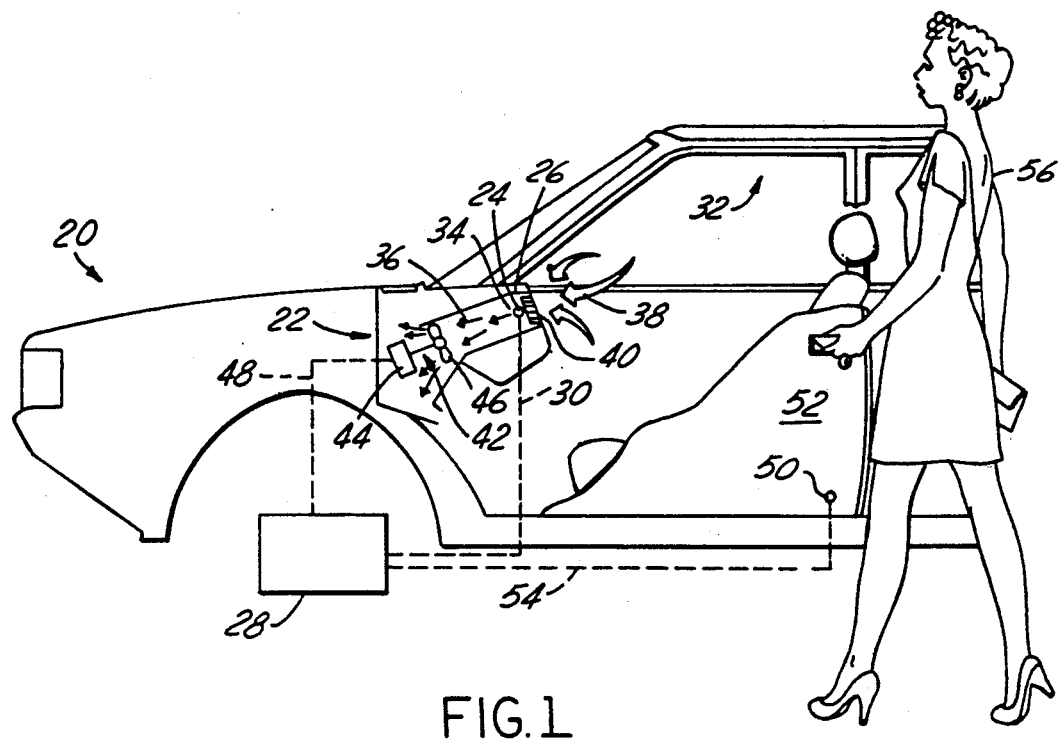
FIG. 1 is a diagrammatical side view of a portion of a vehicle illustrating the use of the present invention.

A vehicle 20 illustrated in FIG. 1 includes a temperature sensing device 22 with a sensor or thermistor 24 located within a dashboard 26. Thermistor 24 transfers information to a controller 28 via a signal control line 30. Thermistor 24 is intended to measure temperature $T_{comp}$ within an interior passenger compartment 32 of vehicle 20, but is located a region 34 of vehicle 20 that generally maintains a temperature $T_{dash}$ that is different from that of passenger compartment 32. Therefore, before $T_{comp}$ may be accurately measured by thermistor 24, air 36 within region 34 of dashboard 26 at $T_{dash}$ must be purged by pulling air 38 from within passenger compartment 32 that is at $T_{comp}$ using a vent 40 within dashboard 26.

To purge air 36 at $T_{dash}$ within region 34, temperature sensing device 22 includes an aspirator 42 comprising both an electric motor 44 and an impeller 46. Aspirator 42 pulls air 38 from the passenger compartment 32 at $T_{comp}$ through vent 40. Aspirator 42 is connected to controller 28 via a power line 48.

In more conventional systems, purging does not typically begin until the ignition system of vehicle 20 is activated, which is the earliest during an operational cycle that the vehicle's automatic temperature control ("ATC") system is started. The ATC system uses the temperature reading by thermistor 24 to activate subsystems that will lower or raise compartment temperature to meet customer expectations. Relevant subsystems of the ATC system include ventilation mode, recirculation door positions, blower speeds and refrigeration cycles. Until purging of air of dissimilar temperature is completed, precise implementation of ATC subsystems is impossible, since the ATC system may only make gross assumptions regarding $T_{comp}$ until purging is complete.

The location and use of a sensor 50 associated with the use of a door 52 of vehicle 20 is an important feature of the present invention. Sensor 50 is connected to controller 28 when triggered by the actions of a passenger 56 entering the vehicle 20. Controller 28 then selectively activates aspirator 42 to purge the air 36 from around thermistor 24, allowing accurate temperature readings to be made when the ATC is activated. ATC operation efficiency is increased while simultaneously improving passenger comfort.

In a preferred embodiment, purging begins when sensor 50 is triggered by slight movement of door 52, for example, when door 52 becomes ajar as passenger 56 is about to enter the vehicle 20 through door 52. Alternatively, purging may begin upon unlocking of door 52, when door 52 is unlatched, or even when a vehicle lighting system is activated, such as what happens when door 52 is opened, triggering a sensor that turns on a dome light. What is important, however, is that purging begin before passenger 56 enters the passenger compartment 32 of the vehicle 20 and the ATC system is started.

Figure 2:
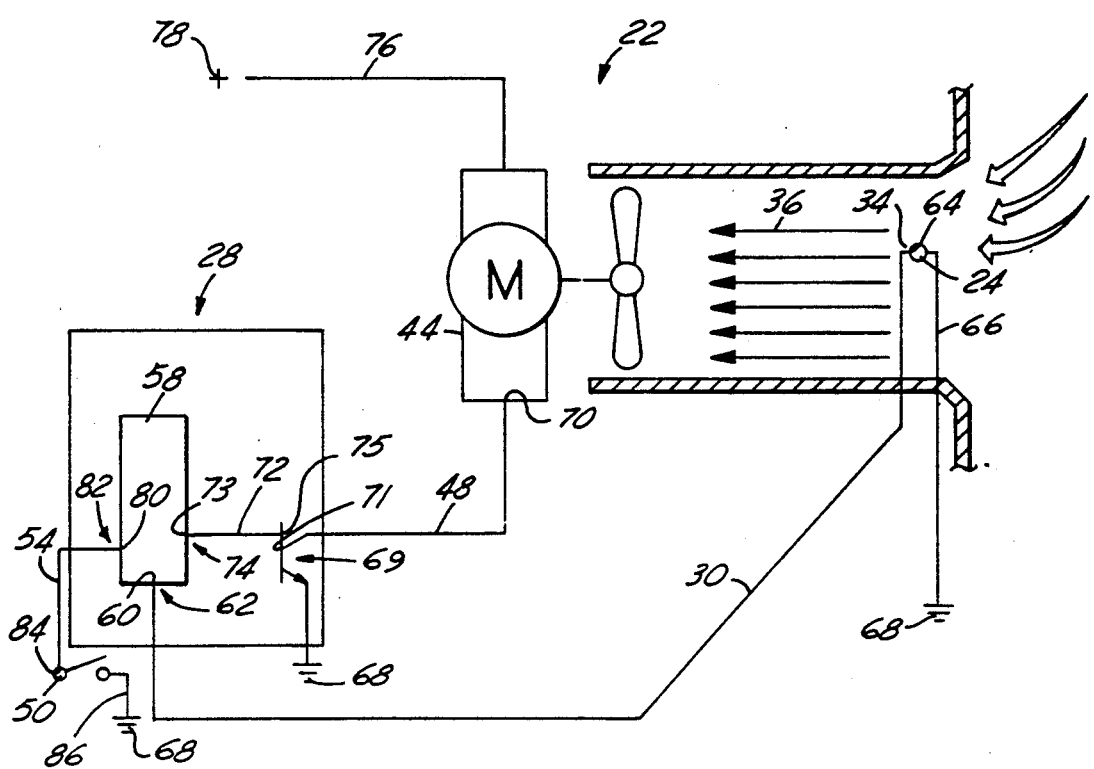
FIG. 2 is a schematic illustrating a device constructed according to the present invention.

The operations of temperature sensing device 22 and controller 28 are shown in greater detail in the schematic of FIG. 2. In a preferred embodiment, controller 28 includes a processor 58. Processor 58 comprises a Motorola MC68HC11 chip having a plurality of ports. Signal control line 30 extends between processor 58 and thermistor 24. An end 60 of line 30 is connected to processor 58 at port 62, designated as port E within the Motorola MC68HC11, while the other end 64 of line 30 is connected to thermistor 24. The analog signal sent by thermistor 24 is converted to a digital signal at port 62. A line 66 runs between thermistor 24 and a vehicle ground 68 for proper thermistor operation. Power line 48 extends between motor 44 and an npn transistor 69 within controller 28. An end 70 of power line 48 is attached to motor 44 while the other end 71 is attached to transistor 69. A signal control line 72 extends between processor 58 and transistor 69. An end 73 of line 72 is connected to processor 58 at port 74, designated as port B within the Motorola MC68HC11, while the other end 75 of line 72 is connected to transistor 69. Transistor 69 acts as a switch responding to a signal sent by signal control line 72 from processor 58 to connect power line 48 to vehicle ground 68 to complete the circuit required to activate motor 44. Power from the positive pole of a battery supply 78 is provided using a power line 76 that extends from battery supply 78 and motor 44. Finally, signal control line 54 extends between processor 58 and sensor 50. An end 80 of line 54 is connected to processor 58 at port 82, designated as Port C within the Motorola MC68HC11, while the other end 84 of line 54 is connected to sensor 50. A line 86 extends between sensor 50 and vehicle ground 68.

Sensor 50 is essentially a switch that is triggered by an appropriate event associated with door 52 of FIG. 1. For example, in the illustrated embodiment, when door 52 becomes ajar, line 54 is connected to vehicle ground 68. Controller 28 will selectively close a circuit between battery supply 78 and vehicle ground 68 to start aspirator 42. As aspirator 42 is started, air 36 in region 34 is purged as discussed above.

Figure 3:
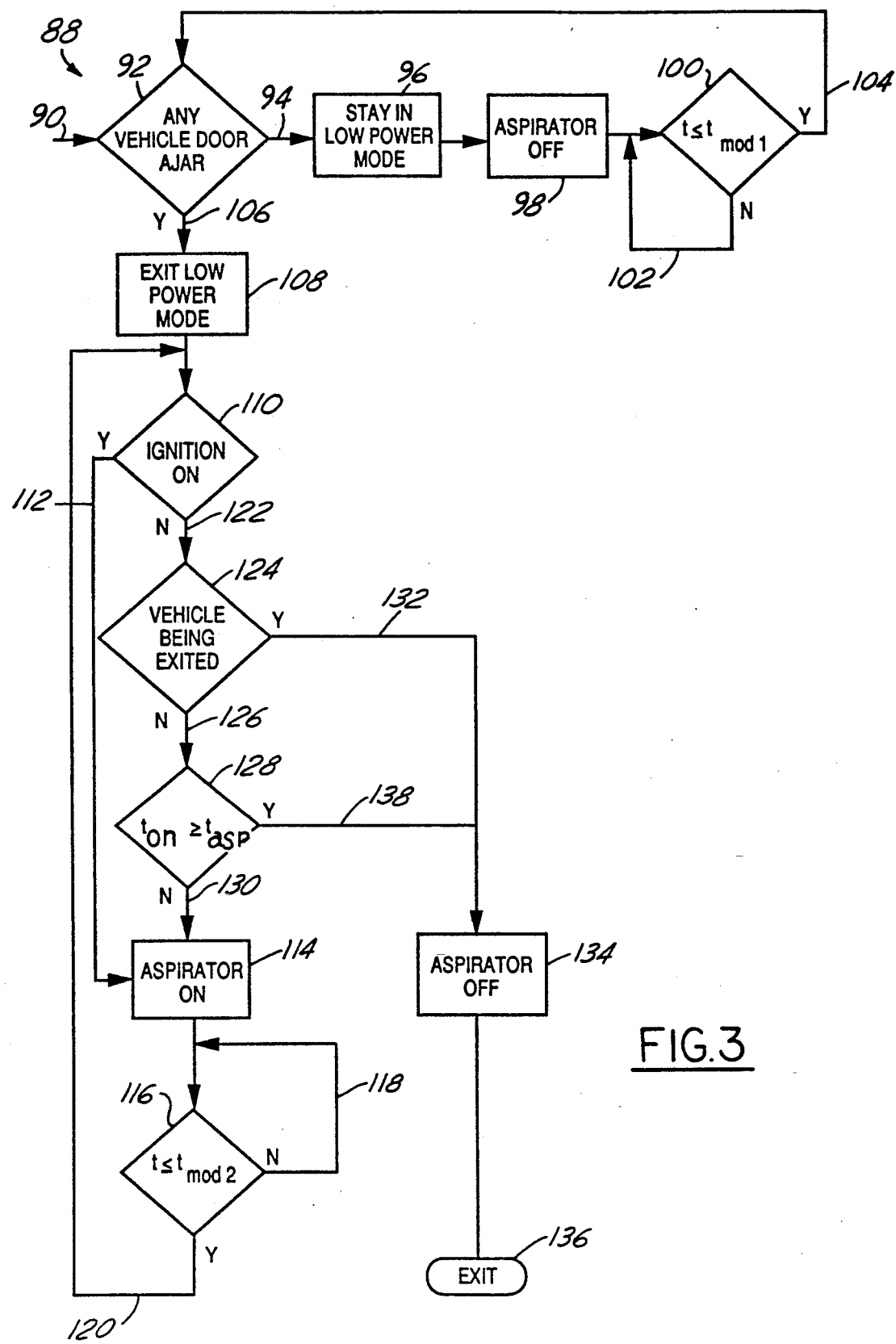
FIG. 3 is a flow diagram according to an embodiment of the present invention.

A flow diagram 88 of a preferred system of operation of the present operation is shown in FIG. 3. At entry point 90, controller 28 is in a low power mode. At decision point 92 a determination is made whether a vehicle door is ajar using information from sensor 50 in conjunction with line 48. If the door is not ajar, branch 94 is followed. As shown at point 96, controller 28 stays in low power mode at point 96 and aspirator 42 is turned off if on. Then at decision point 100, branch 102 is looped until time of looping, t, is equal or greater than $t_{mod\ 1}$. In a preferred embodiment, $t_{mod\ 1}$ is approximately 31.25 msec.

Once t is greater than or equal to $t_{mod\ 1}$, branch 104 is followed back to decision point 92. If vehicle door 52 is ajar, branch 106 is followed. Then, at point 108, controller 28 exits its low power mode. At decision point 110, if the ignition of vehicle 20 is on, branch 112 is followed to point 114, where aspirator 42 is either turned on or maintained in an activated mode. Thus, as long as the ignition is on, temperature sensing device 22 continues to update temperature measurements taken by thermistor 24 by drawing air 38 through vent 40, as shown in FIGS. 1 and 2. This information is used by the ATC system to control subsystems such as those discussed above.

At decision point 116, branch 118 is looped until time of looping, t, is equal or greater than $t_{mod\ 2}$. In a preferred embodiment, $t_{mod\ 2}$ is approximately 125 msec. Once t is greater than or equal to $t_{mod\ 2}$, branch 120 is followed back to decision point 110.

If the ignition is not on at decision point 110, branch 122 is followed. At decision point 124, a determination is made whether the vehicle 20 is being exited. In one preferred embodiment, this determination is made using sensor 50, shown in FIGS. 1 and 2, in conjunction with knowledge of when the door 52 was last ajar. If the vehicle is not being exited, branch 126 is followed to decision point 128. At decision point 128 a determination is made whether time of aspirator operation, $t_{on}$ is greater than or equal to time $t_{asp}$. In a preferred embodiment, $t_{asp}$ is approximately 2 minutes. If $t_{on} < t_{asp}$, branch 130 is followed to point 114 and aspirator 42 stays on.

If, however, vehicle 20 is being exited at decision point 124, branch 132 is followed to point 134 where aspirator 42 is turned off. Then high power mode is exited at exit point 136 to further conserve battery power 78, with the controller 28 returning to low power mode. Similarly, if $t_{on}$ is greater than or equal to $t_{asp}$ at decision point 128, branch 138 is followed to point 134 and exit point 136. Decision point 128 takes into account those situations where a passenger 56 briefly visits, but does not intend to drive vehicle 20. Once again, aspirator 42 is turned off at point 134 and the high power mode exited in favor of an energy saving mode at point 136.

Preferred embodiments of the present invention have been described. It is to be understood that variations and modifications may be employed without departing from the scope of the present invention. Accordingly, the following claims should be studied to determine the true scope of the present invention.

We claim:

1. A method for accurately measuring a temperature of air from an interior passenger compartment of a vehicle comprising the steps of:
   sensing when a passenger is entering said vehicle;
   activating an aspirator upon said sensing;
   purging air surrounding a thermistor by pulling said air from said passenger compartment through a vent; and
   measuring said temperature using said thermistor.

2. A method as recited in claim 1, wherein said sensing comprises the steps of:
   opening, at least partially, a door of said vehicle; and
   triggering a sensor associated with said opening of said door.

3. A method as recited in claim 1, wherein said sensing comprises the steps of:
   unlatching a door of said vehicle; and
   triggering a sensor associated with said unlatching of said handle.

4. A method as recited in claim 1, wherein said sensing comprises the steps of:
   unlocking a door of said vehicle; and triggering a sensor associated with said unlocking of said door.

5. A method as recited in claim 1, wherein said activating step comprises the step of sending a signal upon said sensing to a controller.

6. A method as recited in claim 5, wherein said activating step comprises the step of closing a circuit between said controller and said aspirator.

7. A method as recited in claim 1, further comprising the steps of:
waiting a predetermined period of time after said activating of said aspirator;
sensing whether the ignition of said vehicle is on; and
deactivating said aspirator.

8. A method as recited in claim 7, wherein said deactivating comprises the step of exiting said vehicle.

9. A method as recited in claim 8, further comprising the steps of:
exiting a low power mode upon said sensing of said entering by said passenger; and
entering said low power mode upon said deactivating of said aspirator.

10. A method as recited in claim 7, wherein said sensing comprises the step of triggering a sensor upon opening, at least partially, a door of said vehicle.

11. For use in a temperature sensing device associated with an automatic temperature control system of a vehicle, wherein an aspirator is activated to purge air surrounding a thermistor in favor of air pulled from an interior passenger compartment of a vehicle such that a temperature measured by said thermistor corresponds to the temperature of said passenger compartment, an improvement comprising:
a sensor that determines when a passenger is entering said vehicle such that said aspirator is activated before said passenger enters said vehicle and said automatic temperature control system is started, increasing the accuracy of the temperature measured by said thermistor that is used by said automatic temperature control system.

12. An improvement as recited in claim 11, wherein said sensor reacts to an opening of a door of said vehicle.

13. An improvement as recited in claim 11, wherein said sensor reacts to an unlocking of a door of said vehicle.

14. An improvement as recited in claim 11, wherein said sensor reacts to an unlatching of a door of said vehicle.

15. A temperature control device for a vehicle comprising:
a thermistor for measuring temperature;
an aspirator with a motor and an impeller, said aspirator used to purge air surrounding said thermistor;
a sensor that sends a signal upon sensing that a passenger is about to enter the vehicle; and
a controller, said controller connected to said thermistor, said aspirator, and said sensor, said controller sequentially receiving said signal from said sensor, activating said aspirator, and activating said thermistor.

* * * * *